United States Patent
Pucci et al.

(10) Patent No.: US 7,384,257 B2
(45) Date of Patent: Jun. 10, 2008

(54) DEVICE FOR REMOVING DOSES OF PLASTIC MATERIAL FROM AN EXTRUDER

(75) Inventors: Fabrizio Pucci, Castel Guelfo (IT); Florenzo Parrinello, Medicina (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 15 days.

(21) Appl. No.: 10/533,318

(22) PCT Filed: Apr. 23, 2003

(86) PCT No.: PCT/EP03/04214

§ 371 (c)(1),
(2), (4) Date: Jun. 10, 2005

(87) PCT Pub. No.: WO2004/039553

PCT Pub. Date: May 13, 2004

(65) Prior Publication Data

US 2006/0034960 A1   Feb. 16, 2006

(30) Foreign Application Priority Data

Oct. 31, 2002   (IT) .......................... BO2002A0683

(51) Int. Cl.
  *B29C 43/08*   (2006.01)
  *B29C 43/34*   (2006.01)
(52) U.S. Cl. ...................... 425/297; 425/261; 425/310; 425/311; 425/313; 425/348 R; 425/809
(58) Field of Classification Search ................ 425/261, 425/297, 310, 311, 313, 348 R, 809
See application file for complete search history.

(56) References Cited

U.S. PATENT DOCUMENTS

| 3,128,500 | A | * | 4/1964 | Cunningham | 425/313 |
| 3,324,510 | A | * | 6/1967 | Kleeb | 425/310 |
| 3,792,950 | A | * | 2/1974 | Cuff | 425/313 |
| 3,972,666 | A | * | 8/1976 | Pandur | 425/311 |
| 4,518,336 | A | * | 5/1985 | Alieri | 425/809 |
| 4,968,469 | A | * | 11/1990 | White | 264/148 |
| 5,456,587 | A | * | 10/1995 | Ingram | 425/311 |
| 5,603,964 | A | * | 2/1997 | Rote et al. | 425/313 |
| 5,807,592 | A | | 9/1998 | Alieri | 425/347 |
| 5,811,044 | A | | 9/1998 | Rote et al. | 264/148 |
| 6,368,094 | B1 | | 4/2002 | Dennis et al. | 425/144 |
| 6,422,854 | B1 | * | 7/2002 | Dennis et al. | 425/311 |

FOREIGN PATENT DOCUMENTS

| EP | 0 331 485 A | 9/1989 |
| EP | 1 101 586 A | 5/2001 |
| GB | 976 615 A | 12/1964 |

* cited by examiner

*Primary Examiner*—Robert B. Davis
*Assistant Examiner*—Joseph Leyson
(74) *Attorney, Agent, or Firm*—Nixon & Vanderhye P.C.

(57) ABSTRACT

A device for removing doses of plastic material from the outflow orifice of an extruder by means of at least one removal element movable with respect to the extruder and provided with a receptacle for a dose removed from the orifice, the removal element comprising a severing element adapted to cut into the plastic material dispensed by the extruder along a severing edge advancing through the material from one side of the orifice to the other, the receptacle being shaped so as to accomodate the dose and allow its expulsion substantially in the directon of the severing edge.

31 Claims, 9 Drawing Sheets

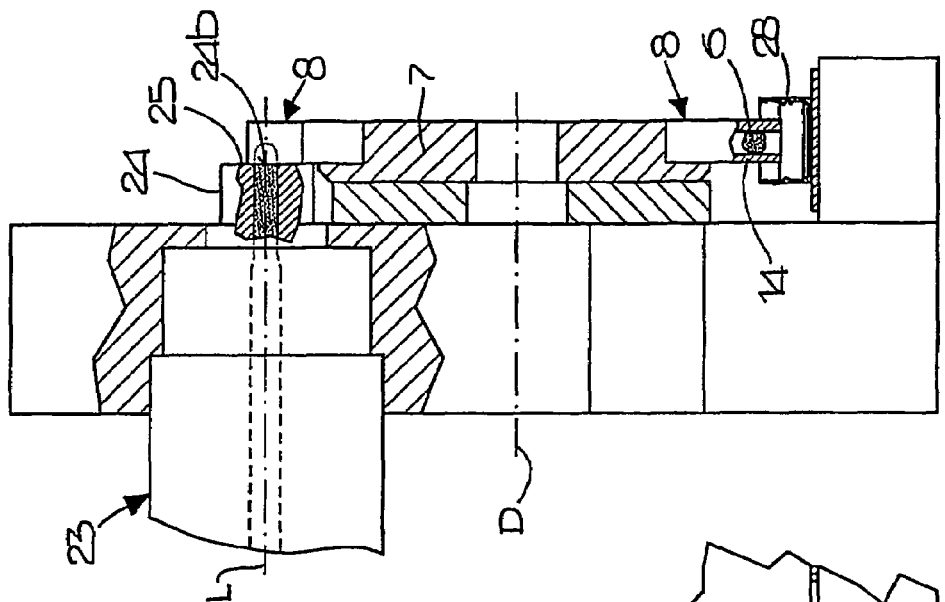
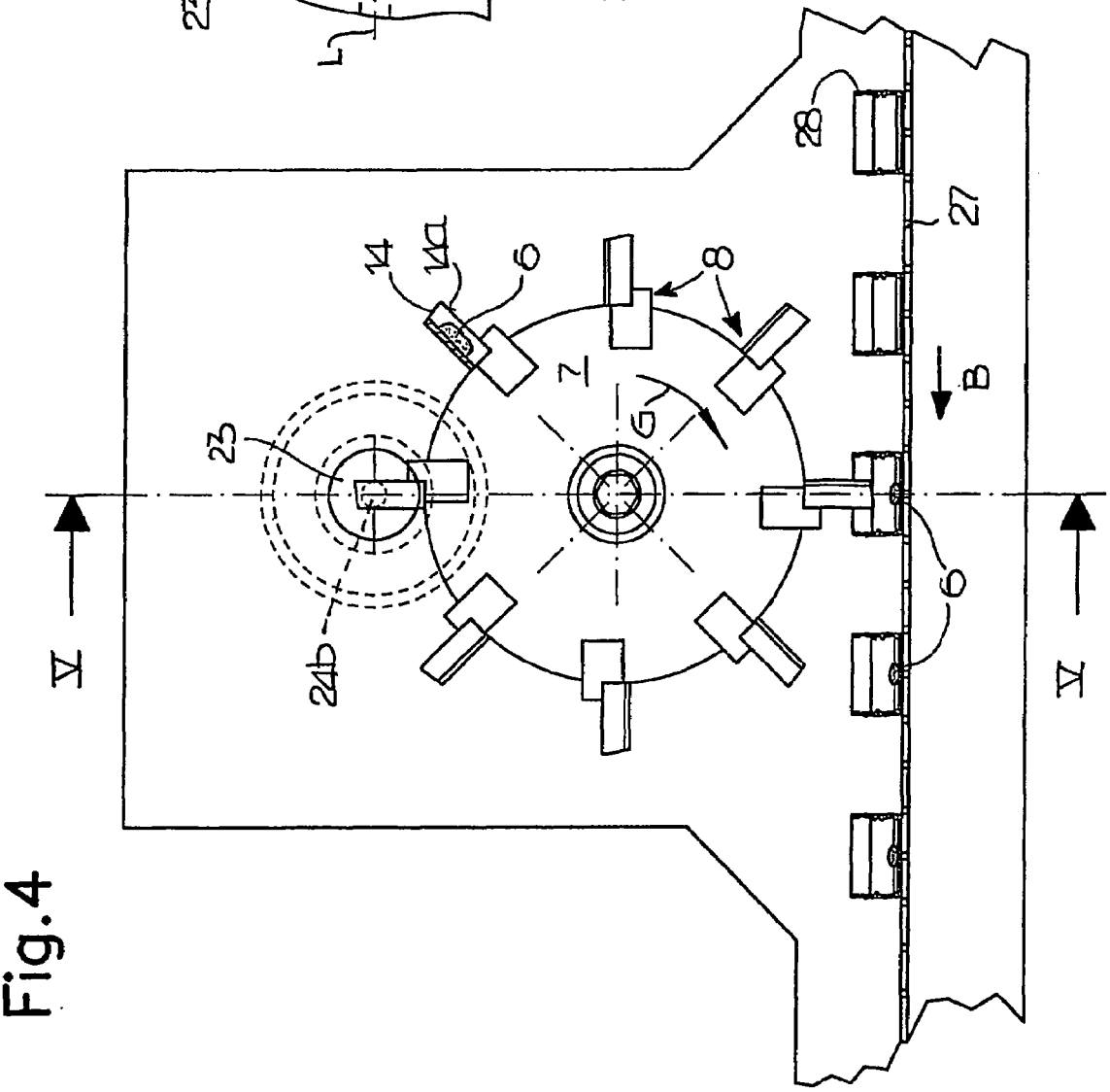

DEVICE FOR REMOVING DOSES OF
PLASTIC MATERIAL FROM AN EXTRUDER

This application is the US national phase of international application PCT/EP2003/004214 filed 23 Apr. 2003 which designated the U.S. and claims benefit of IT BO2002A000683, filed 31 Oct. 2002. The entire contents of these applications are incorporated herein by reference.

1. Technical Field

The present invention relates to a device for removing doses of plastic material from an extruder.

2. Background Art

Devices for removing doses of plastic material from an extruder and depositing them in input to a carousel that is adapted for example to form by compression molding articles such as closures, caps, liners and the like are currently known with particular reference to U.S. Pat. Nos. 5,603,964, 5,807,592, and 5,811,044.

These devices are generally constituted by a rotating disk on which concave cup-like elements are distributed peripherally; said cups move along a circular path that is substantially tangent to the orifice for the outflow of the plastic material from the extruder; in their motion, the cups remove from said orifice, by scraping, preset quantities of plastic material, subsequently unloading them with the aid of pneumatic or mechanical devices into respective cavities provided in the carousel, where they are then compressed in order to form the articles.

With such cups, the individual doses are formed by severing the flow of plastic material that exits from the extruder. This severing method causes alterations to the physical characteristics of the material, which though being localized, are memorized in the material and cause in the finished product defects that are sometimes not tolerable.

DISCLOSURE OF THE INVENTION

The aim of the present invention is to obviate the cited drawbacks by providing a device that is adapted to remove from the extruder doses of plastic material in the pasty state that maintain the intended physical and mechanical characteristics, thus producing finished products that are substantially free from defects.

Within this aim, an object of the present invention is to provide a removal device that is improved so as to work at a higher speed than conventional devices and is therefore capable of ensuring a higher productivity.

Another object of the present invention is to provide a structure that is simple and safe and effective in operation in order to be able to work with materials of different kinds.

This aim and these and other objects that will become better apparent hereinafter, are achieved by the present device for removing doses of plastic material from an extruder by means of at least one removal element that can move with respect to said extruder and is provided with a receptacle for a dose removed from the outflow orifice of said extruder, wherein said removal element comprises a severing element that is adapted to cut into the plastic material dispensed by said extruder along a severing edge that advances through the material from one side of said orifice to the other, and said receptacle is shaped so as to accommodate said dose and allow its expulsion substantially in the direction of said severing edge.

BRIEF DESCRIPTION OF THE DRAWINGS

Further features and advantages will become better apparent from the detailed description of some embodiments of the invention, illustrated only by way of non-limitative example in the accompanying drawings, in which:

FIG. 4 is a partially sectional front elevation view of a first constructive embodiment of the device according to the invention;

FIG. 5 is a sectional view, taken along the line V-V of FIG. 4;

WAYS OF CARRYING OUT THE INVENTION

In the examples of the embodiments that follow, individual characteristics, given in relation to specific examples, may actually be interchanged with other different characteristics that exist in other examples of embodiments.

Figure 2:
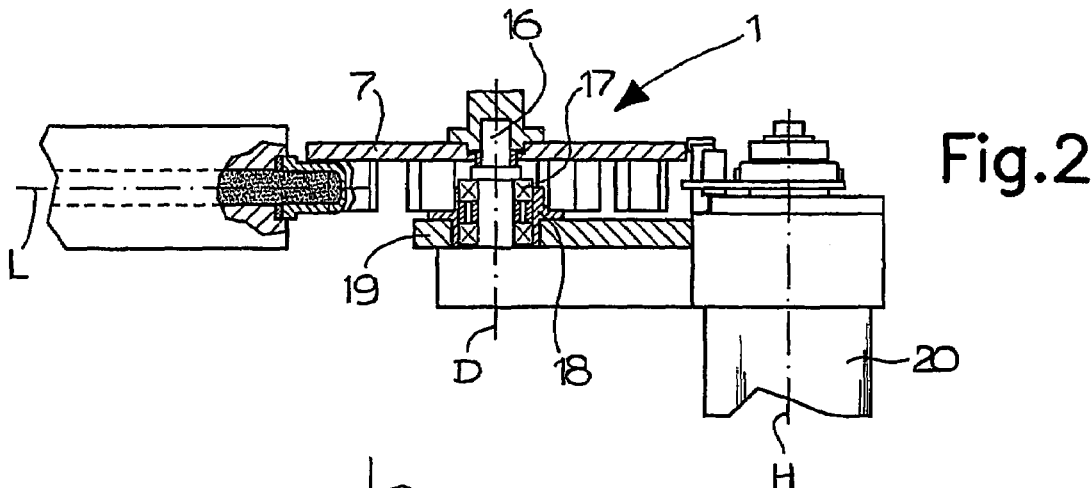
FIG. 2 is a partially sectional side elevation view, taken along a vertical plane, of the device of FIG. 1.
Figure 1:
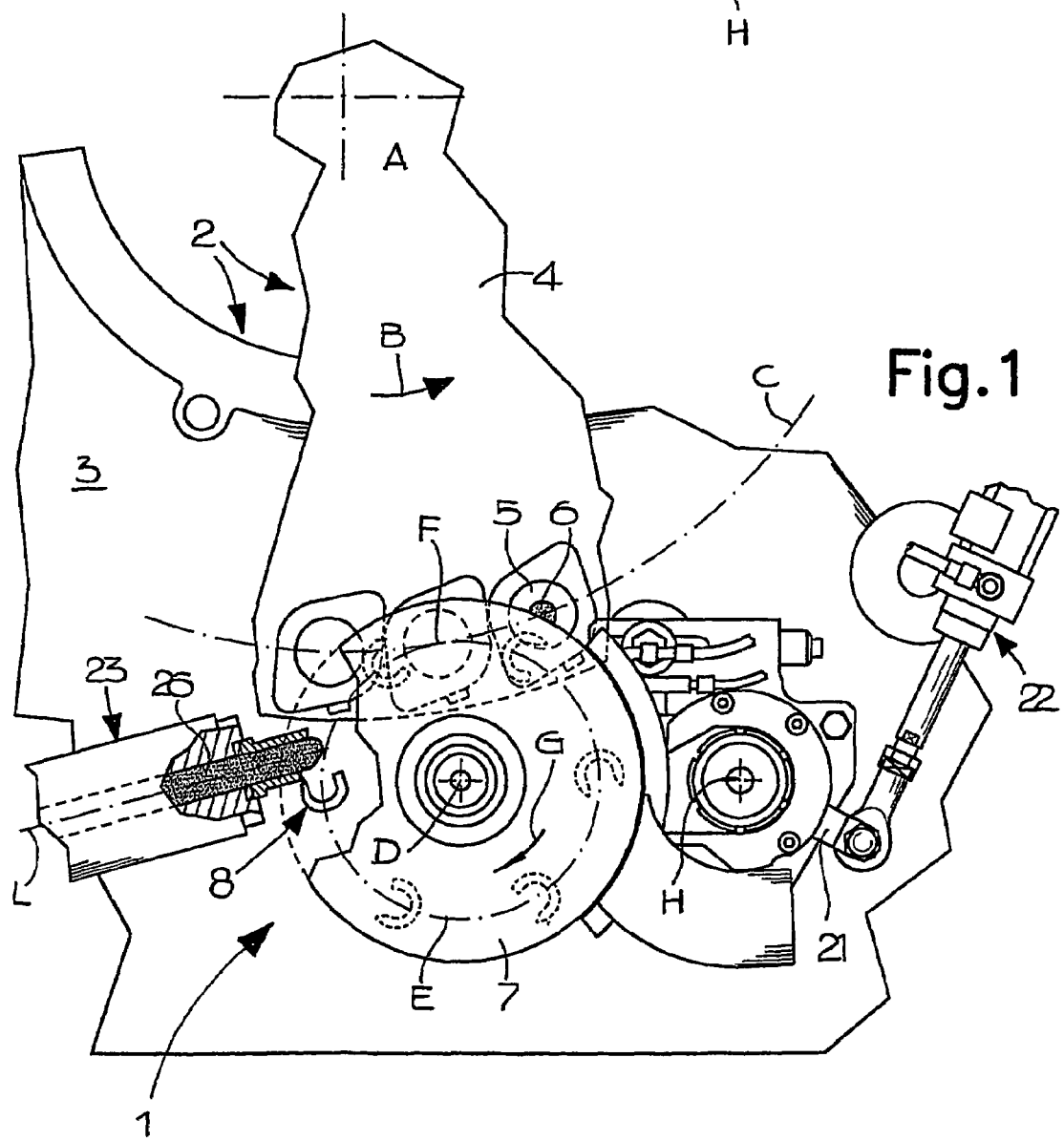
FIG. 1 is a partially sectional plan view of the device according to a first embodiment.
Figure 3:
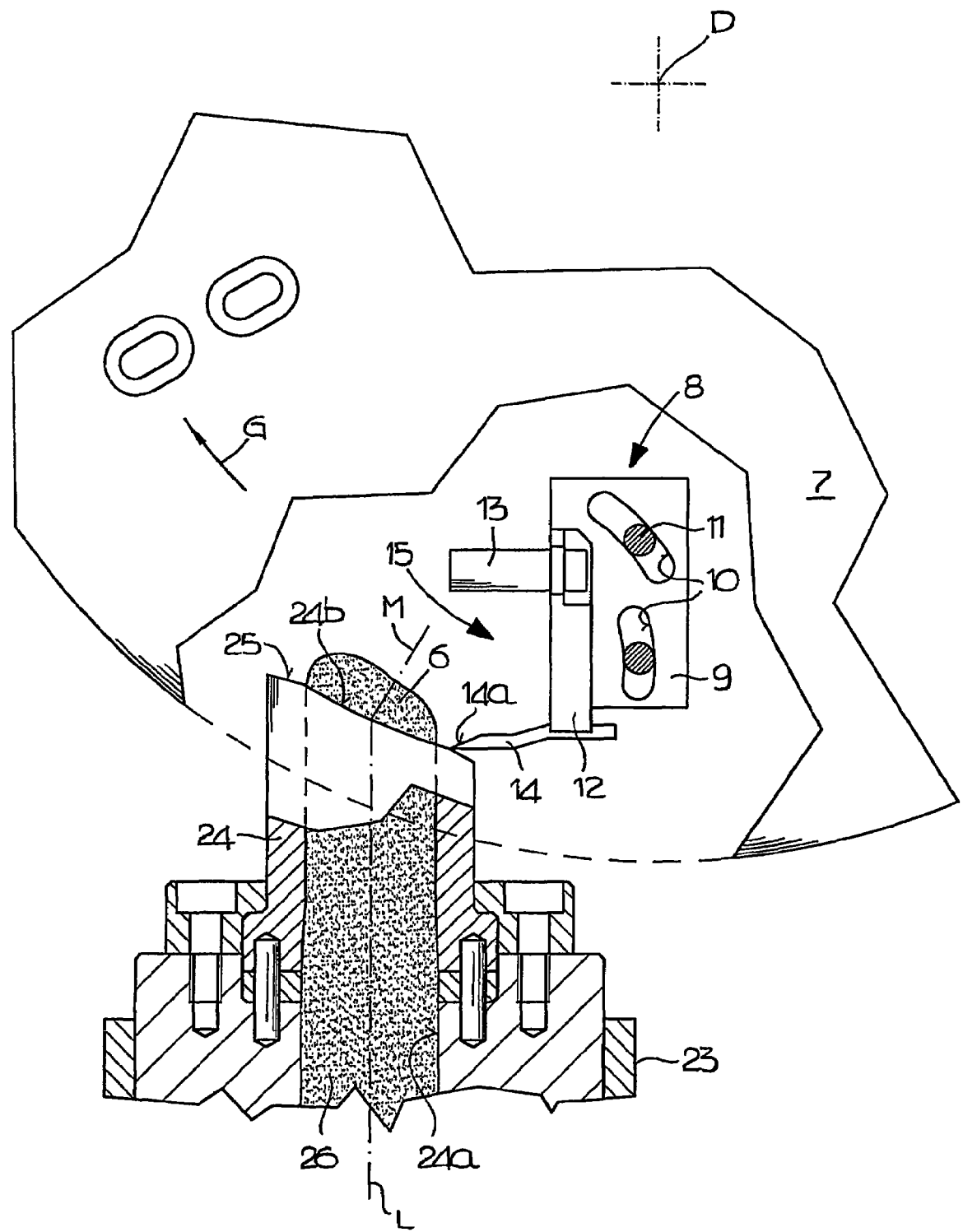
FIG. 3 is a partially sectional detail plan view of the device of FIG. 1.

With particular reference to FIGS. 1 to 3, the reference numeral 1 generally designates a device according to the invention for removing doses of plastic material to be fed into a molding carousel 2, as described in the above cited U.S. patents, which is suitable to mold articles such as closures or liners. For the sake of brevity in the description of said carousel, the footing 3 of said carousel is shown schematically; said footing supports, so that it can rotate about a vertical axis A, a circular turntable 4 that is provided peripherally with a plurality of recesses 5 that constitute the article molding chamber and are part of the lower mold parts of compression-molding units. The turntable 4 turns in the direction B, so that the recesses 5 trace a circular path, designated by C, and are fed with doses 6 of plastic material.

The device 1 for removing the doses 6 comprises a disk 7, which can rotate about an axis D that is parallel to A. The disk 7 lies on a plane arranged above the turntable 4, and multiple dose removal elements 8 are rigidly coupled to its lower face and arranged along a circumference E that is concentric to the axis D and tangent to the circular path C.

The removal elements 8 are angularly equidistant with respect to the axis D and in step with the recesses 5, so that each element 8 is superimposed on a respective recess 5 in the point of tangency F of the circumference E with respect to the path C.

As shown more clearly in FIG. 3, each element 8 is constituted by an L-shaped member that is composed of a rectangular base 9 that rests on the lower face of the disk 7 and in which there are two slots 10, through which screws 11 are guided which engage in the disk 7 in order to fix the base under the disk 7.

A back wall 12 is rigidly coupled to the base 9 and is perpendicular thereto and substantially radial with respect to the axis D. A side wall 13 and respectively a severing or cutting element 14, that could be constituted by a blade, are fixed to the opposite ends of the wall 12, and form a receptacle 15 that is open, in the direction G of the rotation of the disk 7, toward the region where the doses 6 of plastic material are removed. The blade 14 has a cutting or severing edge 14a that could be perpendicular to the disk 7 and is fixed so that it is possible to adjust the distance of the cutting edge 14a from the back wall 12.

It should be noted that the slots 10 are arc-shaped and their center is located in the receptacle 15, so as to be able to adjust their orientation with respect to the direction of rotation G of the disk 7.

The disk 7 is keyed on a vertical shaft 16 (see FIG. 2), which is supported, by way of bearings 17, in a sleeve 18 that is flanged onto an arm 19 that protrudes from the top of a column 20 on which it is mounted so that it can rotate about the axis H, which is parallel to D.

The rotating disk 7 is actuated by way of an adapted motor and a transmission device of the belt or gear type, which are not shown since they are fully conventional.

Proximate to the axis H, the arm 19 is provided with a lug 21, to which the stem of a fluid-operated actuator 22 is articulated; its cylinder is in turn pivoted in the footing 3 of the carousel. The fluid-operated actuator 22 is designed to make the arm 19 perform an angular movement about the axis H and therefore along the circumference E with respect to the axis A of the carousel 2 until it more or less intersects the path C of the recesses 5, so as to adjust, according to the requirements, the extent by which each removal element 8 remains superimposed on a respective recess 5 in order to allow the doses 6 taken by the elements 8 to be deposited in the respective recesses.

The doses 6 to be deposited in the recesses 5 are dispensed by an extruder 23, which is provided with a nozzle 24 for the outflow of the plastic material that continues under the disk 7 and at the level of the removal elements 8. The nozzle 24 is crossed by a channel 24a, whose axis L is perpendicular to the axis D, but is axially offset, with respect to said axis D, laterally toward the point of tangency F. The channel 24a is connected to the outside through a port that constitutes the outflow orifice 24b for the plastic material. However, it is noted that in a fully similar manner the axis L can be arranged radially with respect to the axis D, achieving the same functional result.

The orifice 24b is formed by a rim 25 that is slightly concave, so as to lie on a substantially cylindrical surface, which in the specific case is concentric with respect to the axis D. In this manner, the orifice has an elliptical shape whose central axis M passes through the axis D.

The distance from the axis D of the rim 25 and of the cutting edge 14a of the blade 14 are mutually identical, so that the blade 14 can graze the rim 25 during the rotation of the disk 7.

Operation of the device is as follows: with the rotation of the disk 7, the blade 14 in fact severs a dose 6 from the stream 26 of plastic material that exits from the orifice 24b of the extruder 23 during the time that elapses between the passage of two successive removal elements 8 in front of said orifice. In particular, it should be noted that the cutting edge 14a of the blade 14 allows to obtain a severing edge that advances through the stream 26 in the direction G and forms a dose 6 whose physical characteristics are uniform throughout its thickness.

The blade 14 and the receptacle 15 could be orientated with respect to the orifice 24b so that the dose 6 can be easily accommodated in the receptacle 15, where it is retained by the surfaces of the walls 12, 13 and of the blade 14.

A fundamental prerogative of the device according to the invention consists of the fact that the arrangement of the blade 14 at right angles to the disk 7 allows to provide a receptacle 15 which, in addition to being open frontally, i.e. in the direction G toward the extruder 23, in order to receive the dose 6, is also open vertically downward so as to allow to unload the dose into the respective recess 5 of the carousel 2 by using an expulsion device that consist of a jet of compressed air, possibly assisted by the mechanical action of a piston, as described in the cited U.S. Pat. No. 5,807,598.

The invention is susceptible of numerous modifications and variations, all of which are within the scope of the same inventive concept.

FIGS. 4 and 5 illustrate a first constructive variation of the removal device, according to which the rotating disk 7 and the extruder 23 are mounted respectively so that the rotation axis D and the axis L of the nozzle 24 are horizontal and mutually parallel.

The removal elements 8 for the doses 6 are rigidly coupled to the peripheral region of the disk 7, and the cutting edges 14a of the blades 14 are arranged radially and lie on a vertical plane that is tangent to the rim 25 of the orifice 24b for the outflow of the plastic material. Below the disk there is the upper portion 27 of a conveyor belt, on which closures 28 advance in succession, acting as a replacement of the recesses 5, the doses being successively punched into said closures in order to form the sealing liners.

The unloading of each dose 6 from the containment receptacle 15 into the respective closure 28 occurs parallel to the cutting edge 14a of the removal element 8, radially outward and in a diametrically opposite position with respect to the position for severing and removal from the outflow orifice 24b.

Figure 7:
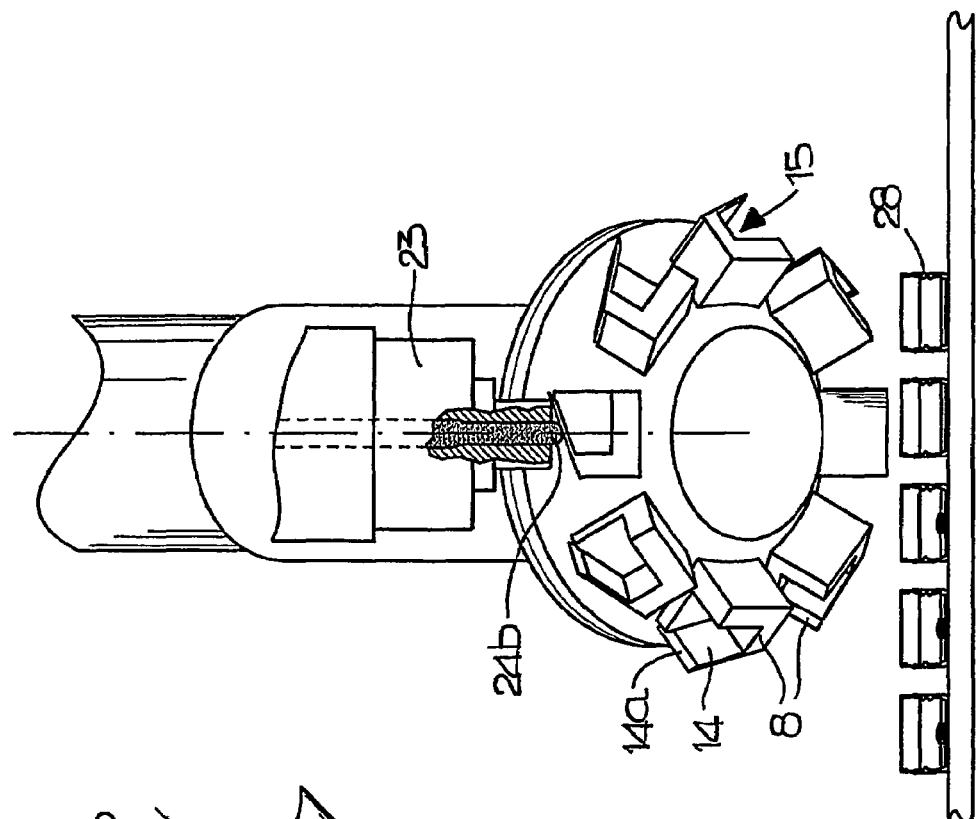
FIG. 7 is a partially sectional front elevation view of the second embodiment of FIG. 6.
Figure 6:
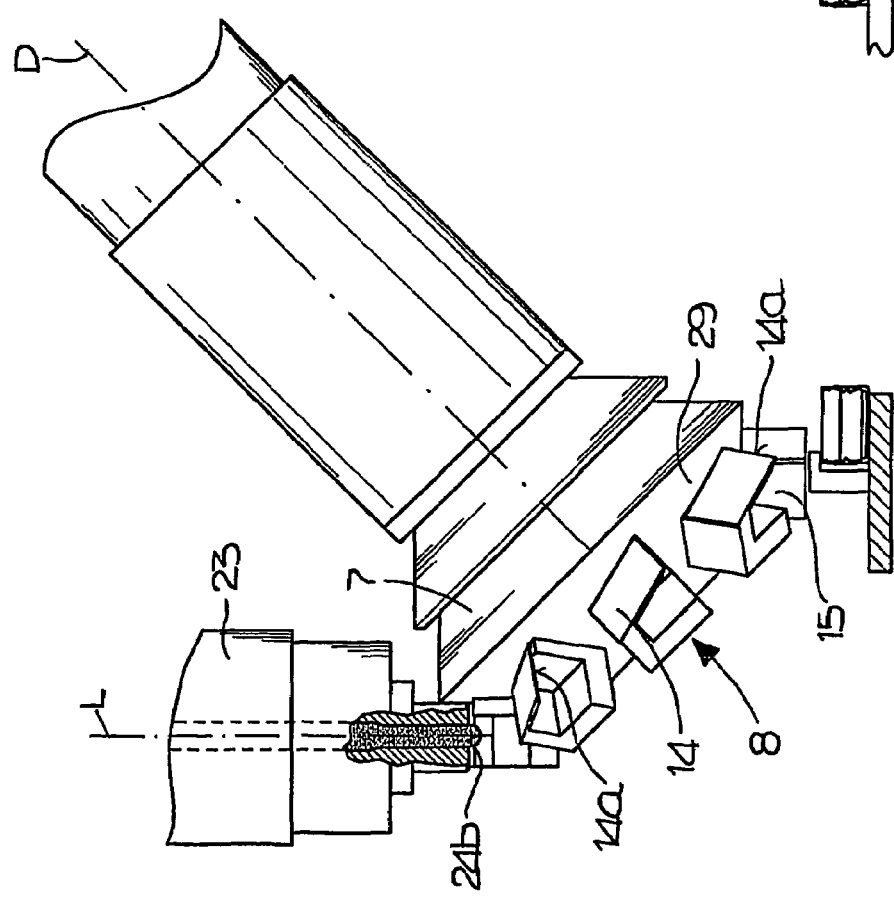
FIG. 6 is a partially sectional side elevation view of a second constructive embodiment of the device according to the invention.

FIGS. 6 and 7 illustrate a second constructive variation of the feeder device according to the invention, in which the extruder 23 is arranged so that its axis L is vertical and the orifice 24b is directed downward. The rotation axis D of the rotating disk 7 is inclined with respect to the vertical by 45° and has a substantially frustoconical shape that tapers downward and forms an angle of 90° with the conical surface 29. In this manner, the removal elements 8 fixed onto the conical surface are orientated so that during the rotation of the disk 7 the cutting edge 14a is horizontal in the point of tangency with the rim 25 of the orifice 24b of the extruder 23 and is vertical in the diametrically opposite position in order to allow the unloading of the doses into the closures 28.

Figure 8:
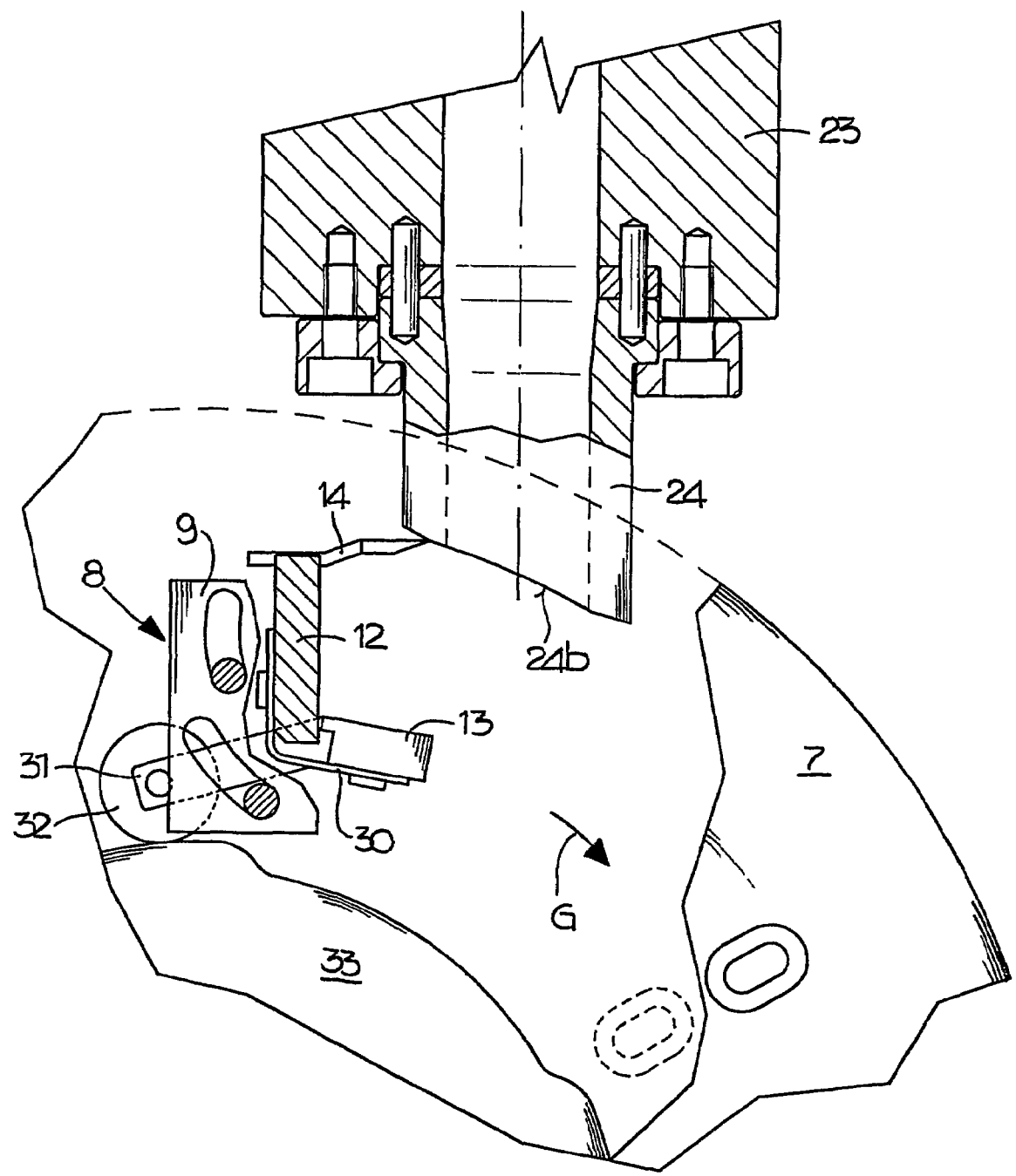
FIG. 8 is a partially sectional plan view of a third embodiment.

FIG. 8 illustrates a third variation, in which the removal elements 8 are provided with a device for retaining and releasing the doses 6. For this purpose, the side wall 13, which delimits the receptacle 15 on the opposite side with respect to the blade 14, is movable and is connected to the back wall 12 by means of an elastic lamina 30, which allows its articulation with respect to the back wall 12 between a first end position and a second end position. The position of the side wall 13 is controlled by a cam follower, which is constituted by an arm 31 that is rigidly coupled to the wall 13 and supports, at its end, a roller 32 that engages on the profile of a stationary cam 33 that is concentric to the axis D. The profile of the cam 33 is shaped so that when the blade 14 has cut the dose 6, the side wall 13 is orientated toward the blade 14 in the first end position, so as to grip and retain the dose.

Figure 10:
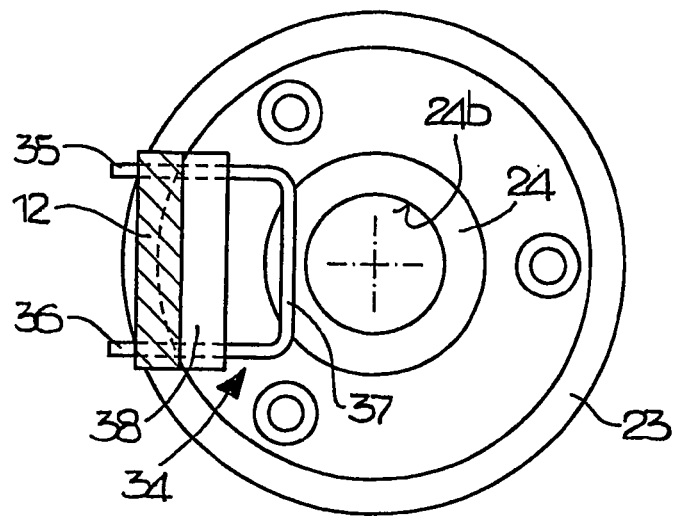
FIG. 10 is a sectional plane view, taken along the line X-X of FIG. 9.
Figure 9:
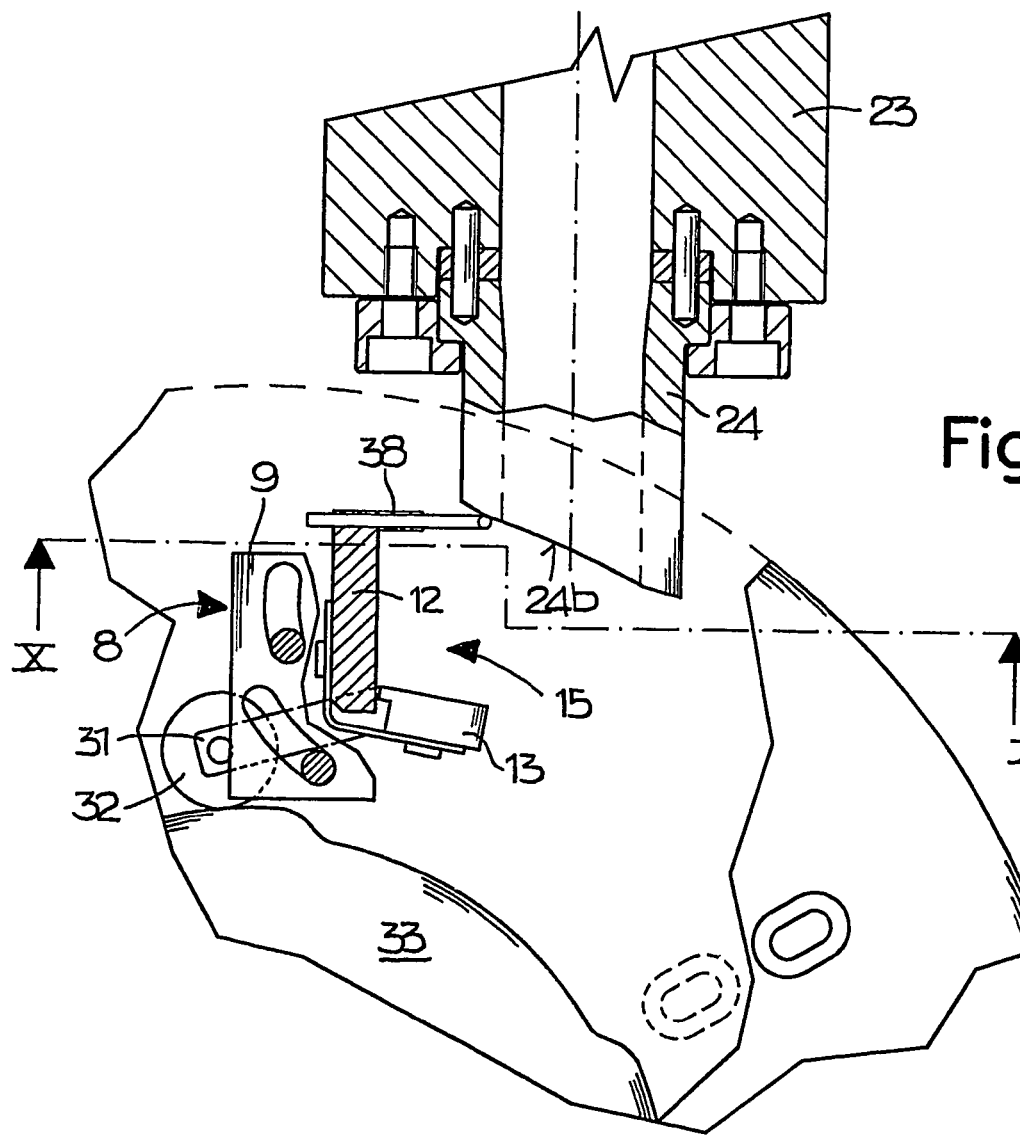
FIG. 9 is a partially sectional plan view of a fourth embodiment.

FIGS. 9 and 10 illustrate a fourth variation, in which instead of the blade 14 there is a metallic wire 34 that is bent in a U-like shape with two portions 35 and 36 that are parallel and fixed to the back wall 12 on the opposite side with respect to the side wall 13 and are joined by a portion 37 that is meant to cut the dose and is parallel to the rotation axis C of the disk 7 for supporting the removal elements 8. A lip 38 protrudes from the wall 12, between the parallel portions 35 and 36, and facilitates the accommodation of the severed dose in the receptacle 15.

Figure 11:
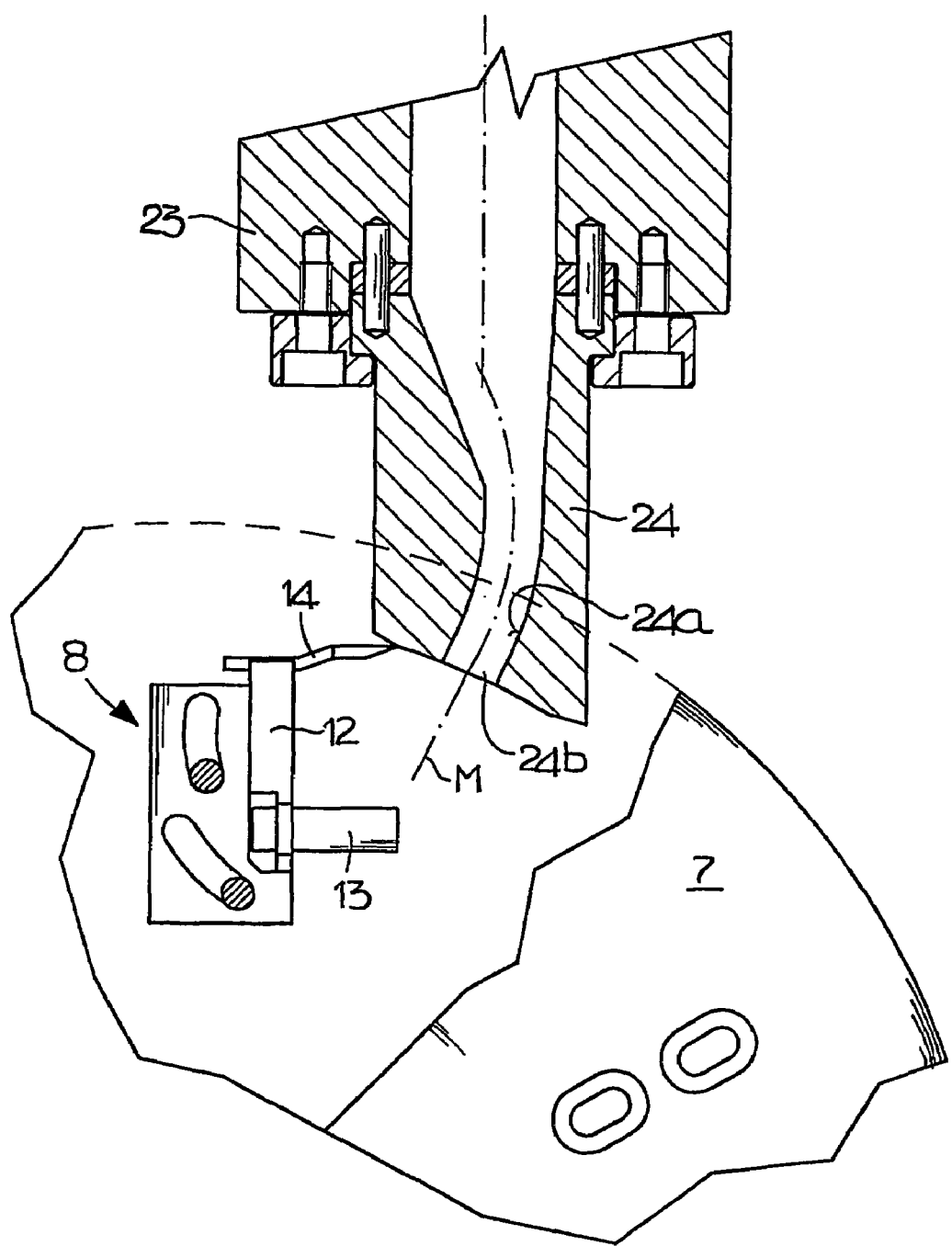
FIG. 11 is a partially sectional plan view of a fifth embodiment.

FIG. 11 illustrates a fifth variation, in which the portion of the outflow channel 24*a* that passes through the nozzle 24 has a curved shape, such that its axis L coincides with the axis M of the orifice and is therefore radial with respect to the axis D of the disk 7: its geometry is therefore particularly suitable to achieve a correct, effective and uniform extrusion of the stream 26 of plastic material.

Figure 12:
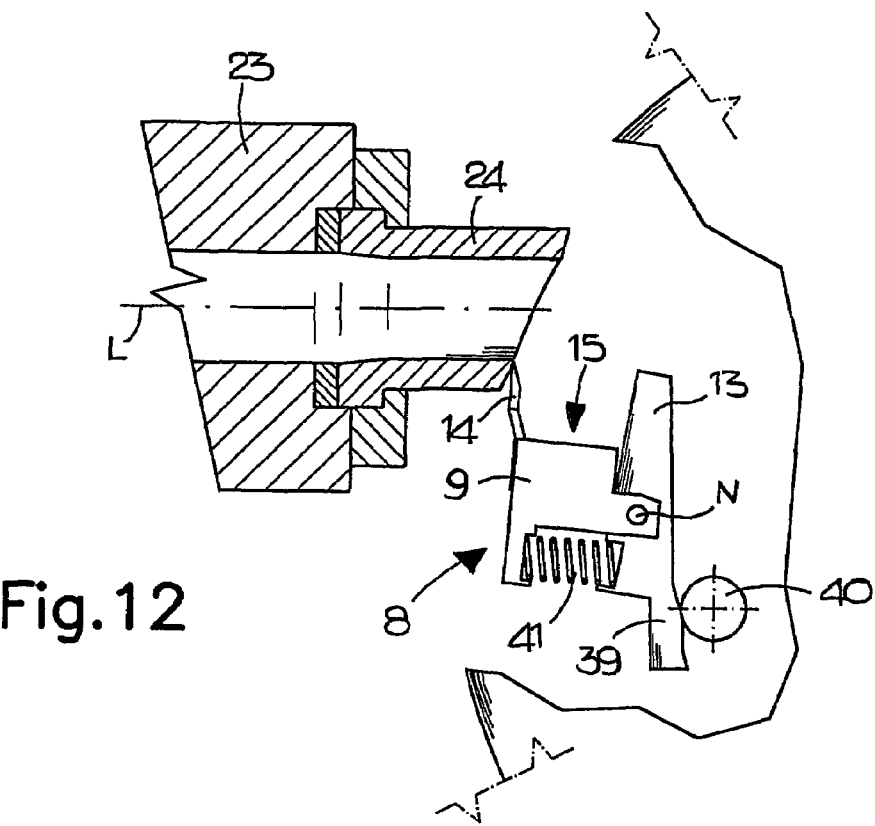
FIG. 12 is a partially sectional plan view of a sixth embodiment.

In a sixth constructive variation, shown in FIG. 12, each one of the removal elements 8 has a side wall 13 that is articulated to the side of the base 9 about an axis N that is parallel to D. The side wall 13 continues to the rear with a tab 39 that is shaped so as to interact, in the motion of the disk 7 and according to a specific synchronization, with a cylindrical abutment 40, constituted for example by a roller that is supported so that it can rotate about its own axis, which is parallel to D, and acts substantially as a stationary cam: this allows to achieve the rotation of the side wall 13 about the axis N, from a first end position to a second end position and specifically in the direction of the opening of the receptacle 15, by the angle required to facilitate the removal of the dose 6 on the part of the blade 14. A helical contrast spring 41, whose opposite ends respectively abut against the tab 39 and the base 9, prevents the rotation of the side wall 13 from the second end position to the first end position, i.e., in the direction for closing the receptacle 15, so as to retain the dose 6 after it has been removed. It should be noted that it may be possible, when the dose 6 is deposited in the respective recess 5, to provide an additional roller, whose axis is parallel to D and which, by interacting with the tab 39, reopens the receptacle 15, facilitating the release of said dose into the receptacle.

Figure 13:
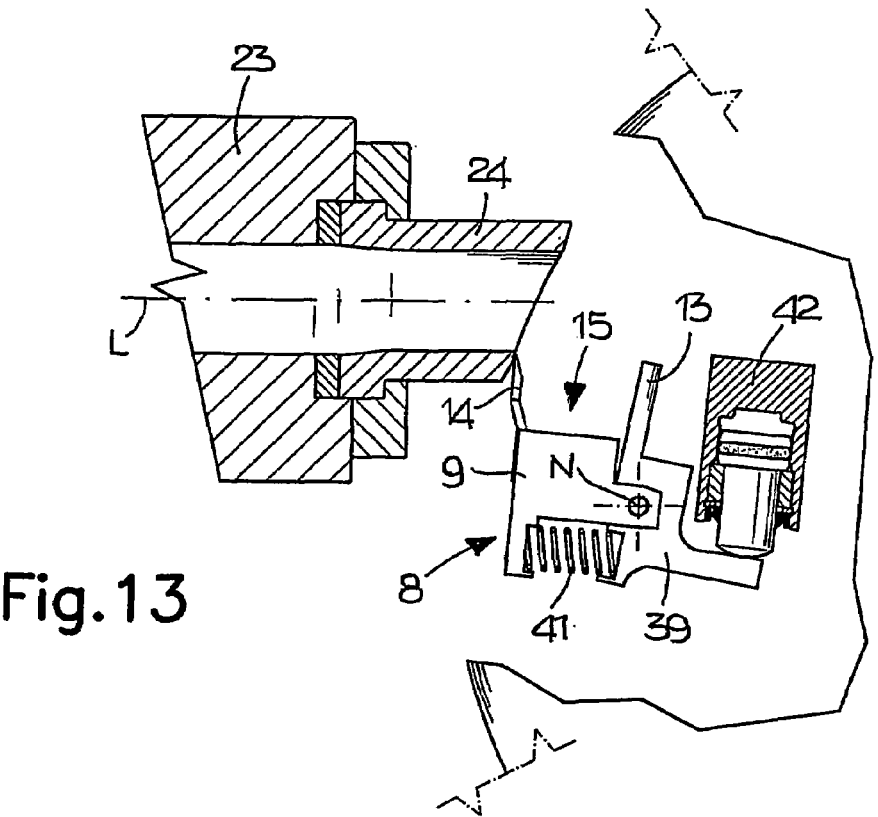
FIG. 13 is a partially sectional plan view of a seventh embodiment.

A seventh constructive variation, shown in FIG. 13, differs from the sixth variation described above in that the tab 39 of the wall 13 protrudes laterally, in a substantially radial direction with respect to the axis D, and has an end portion that is in permanent contact with the end of the stem of a pneumatic piston 42 that is rigidly coupled under the disk 7. The controlled extension of said stem, according to a preset synchronization with respect to the motion of the disk 7, turns the side wall 13 about the axis N from a first end position to a second end position in the direction for opening the receptacle 15 by the angle required to allow the removal of the dose 6; the retention of said dose in the receptacle is then ensured by the actuation of the contrast spring 41, which returns the side wall 13 from the second end position to the first end position.

When necessary, the further subsequent controlled extension of the stem of the pneumatic piston 42 causes the rotation of the side wall 13 again between the first end position and the second end position, releasing the dose 6 into the respective recess 5.

Figure 14:
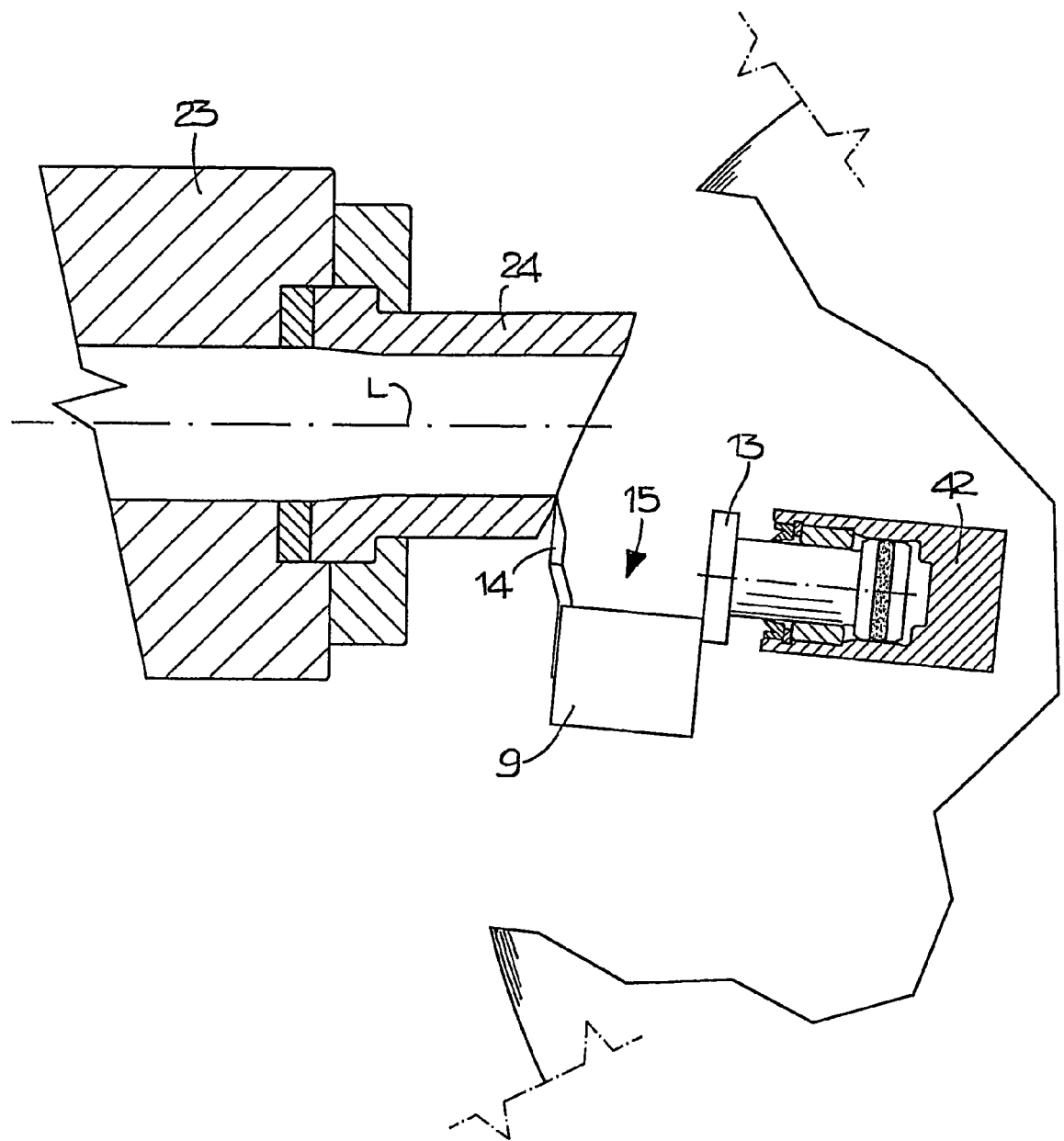
FIG. 14 is a partially sectional plan view of an eighth embodiment.

FIG. 14 illustrates an eighth variation of the device according to the invention, in which the end of the stem of the pneumatic piston 42 of each removal element 8, that could be of the double-acting type, is directly and rigidly connected to the side wall 13.

The controlled extension of the stem of the piston 42 when the dose 6 is removed, allows to arrange the side wall 13 substantially adjacent to the side of the base 9 in a first end position, thus closing the receptacle 15 in order to firmly retain said dose. If required by the specific application, the subsequent retraction, in step with the rotation of the disk 7, of the stem of 30 the piston 42 allows to move the side wall 13 away from the side of the base 9, i.e., in a second end position, in order to produce the release of the dose 6 into the respective recess 5.

It has thus been shown that the invention achieves the intended aim and objects.

All the details may further be replaced with other technically equivalent ones.

In practice, the materials used, as well as the shapes and the dimensions, may be any according to requirements without thereby abandoning the scope of protection of the appended claims.

The disclosures in Italian Patent Application No. BO2002A000683 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the scope of each element identified by way of example by such reference signs.

The invention claimed is:

1. A device for removing doses of plastic material from an extruder and delivering the doses to a forming apparatus in which the doses are compression-moulded, the device comprising at least one removal element which is movable with respect to said extruder for removing a dose and is provided with a receptacle for receiving the dose removed from an outflow orifice of said extruder, said removal element comprising a severing element that is adapted to cut into the plastic material dispensed by said extruder along a severing edge that advances through the material from one side of said orifice to the other, said receptacle being shaped so as to accommodate said dose and allow expulsion thereof substantially in the direction of said severing edge, the receptacle retaining the dose while the at least one removing element moves from a first position, in which the at least one removing element interacts with the extruder, to a second position, in which the at least one removing element interacts with the forming apparatus, the receptacle depositing the dose into a recess associated to said forming apparatus and defining a molding chamber for the dose, wherein said severing edge defines a leading portion of said receptacle which is more advanced than a trailing portion of said receptacle in an intended direction of movement of said severing element.

2. The device according to claim 1, wherein said removal element is provided with an inlet passageway, which is partially bound by said severing edge and through which said dose is receivable into said receptacle, and an outlet passageway, transversely oriented with respect to said severing edge and through which said dose may be expelled from said receptacle.

3. The device according claim 1, wherein said severing element is so shaped as to interact with said dose to an extent not significantly greater than said severing edge.

4. The device according to claim 1, wherein said severing element is constituted by a blade in which said severing edge is substantially perpendicular to the direction of advancement of said blade with respect to said extruder and is suitable to cut the plastic material along a surface that is tangent to the rim of the orifice of said extruder.

5. The device according to claim 1, wherein said severing element comprises a metallic wire that is substantially perpendicular to the advancement direction of said severing element with respect to said extruder and is adapted to cut the plastic material along a surface that is tangent to the rim of the orifice of said extruder.

6. The device according to claim 1, wherein said removal element is supported in a manner that allows adjustment with respect to said extruder in order to allow to keep said severing edge on the plane of tangency with the rim of the orifice of the extruder.

7. The device according to claim 1, wherein said removal element comprises an expelling device for expelling said dose from said receptacle.

8. The device according to claim 1, wherein said removal element comprises a back wall, the severing element that is fixed to a side of said back wall, and a movable side wall on the opposite side with respect to said severing element, said severing element, said back wall and said movable side wall forming said receptacle, said side wall being controlled by an actuation device for actuation of said side wall between a first end position and a second end position.

9. The device according to claim 8, wherein said movable side wall is articulated to said back wall and has a rear tab that is contoured so as to interact with a respective cylindrical abutment, and to actuate said side wall between said first end position and said second end position, a contrast spring being provided which is associated with said side wall in order to actuate said wall between said second end position and said first end position.

10. The device according to claim 8, wherein said movable side wall is associated with an end of a stem of a pneumatic piston for actuating said side wall between said first end position and said second end position.

11. The device according to claim 10, wherein said movable side wall is coupled rigidly to said end of the stem of said pneumatic piston.

12. The device according to claim 8, wherein said movable side wall is connected to said back wall by means of an elastic lamina that is actuated by a cam follower.

13. The device according to claim 12, wherein said cam follower is constituted by a roller that is supported by an arm that is rigidly coupled to said movable side wall of said removal element and is controlled by a stationary cam.

14. The device according to claim 8, wherein in said first end position said movable side wall is arranged so as to retain, in said receptacle, said dose removed by said severing element, and in that in said second end position said movable side wall is arranged so as to release said dose from said receptacle.

15. The device according to claim 8, for feeding doses of plastic material to a molding carousel, which comprises a disk that rotates synchronously with said carousel and peripherally supports said at least one element for removing said doses, wherein the orifice for the exit of said doses has a rim that lies on a surface that is substantially tangent to the plane of rotation of said severing edge.

16. The device according to claim 15, wherein said disk is arranged with a rotation axis thereof vertical, said orifice is orientated substantially radially with respect to said rotation axis, said removal element is rigidly coupled to the lower face of said disk so that said severing edge is parallel to said rotation axis, and said receptacle is open downward in order to allow to unload the dose in a direction that is parallel to said rotation axis into a respective recess of the carousel that lies below said removal element.

17. The device according to claim 15, wherein said disk is arranged with a rotation axis thereof horizontal, said orifice is parallel to said rotation axis, and said removal element is rigidly coupled to the lateral surface of said disk so that said severing edge is substantially radial with respect to the rotation axis of said disk, said receptacle of said dose being shaped so as to unload said dose in a direction that is parallel to said severing edge.

18. The device according to claim 15, wherein said disk is arranged with a rotation axis thereof inclined, said extruder is arranged so that its axis forms an acute angle with said rotation axis, and said removal element is arranged on said disk so that said severing edge is tangent to said orifice.

19. The device according to claim 15, wherein said disk is arranged with a rotation axis thereof inclined and forms a lower face, said removal element being rigidly coupled to said lower face so as to be orientated so that said severing edge is horizontal in an upper position for removing said dose and is vertical in a lower position for unloading said dose into a respective underlying recess.

20. The device according to claim 15, and further comprising a plurality of said removal elements, which are distributed peripherally with respect to the rotation axis of said disk and are angularly mutually equidistant.

21. The device according to claim 1, for feeding doses of plastic material to a molding carousel, which comprises a disk that rotates synchronously with said carousel and peripherally supports said at least one element for removing said doses, wherein the orifice for the exit of said doses has a rim that lies on a surface that is substantially tangent to the plane of rotation of said severing edge.

22. The device according to claim 21, wherein said disk is arranged with a rotation axis thereof vertical, said orifice is orientated substantially radially with respect to said rotation axis, said removal element is rigidly coupled to the lower face of said disk so that said severing edge is parallel to said rotation axis, and said receptacle is open downward in order to allow to unload the dose in a direction that is parallel to said rotation axis into a respective recess of the carousel that lies below said removal element.

23. The device according to claim 21, wherein said disk is arranged with a rotation axis thereof horizontal, said orifice is parallel to said rotation axis, and said removal element is rigidly coupled to the lateral surface of said disk so that said severing edge is substantially radial with respect to the rotation axis of said disk, said receptacle of said dose being shaped so as to unload said dose in a direction that is parallel to said severing edge.

24. The device according to claim 21, wherein said disk is arranged with a rotation axis thereof inclined, said extruder is arranged so that its axis forms an acute angle with said rotation axis, and said removal element is arranged on said disk so that said severing edge is tangent to said orifice.

25. The device according to claim 21, wherein said disk is arranged with a rotation axis thereof inclined and forms a lower face, said removal element being rigidly coupled to said lower face so as to be orientated so that said severing edge is horizontal in an upper position for removing said dose and is vertical in a lower position for unloading said dose into a respective underlying recess.

26. The device according to claim 21, and further comprising a plurality of said removal elements, which are distributed peripherally with respect to the rotation axis of said disk and are angularly mutually equidistant.

27. The device according to claim 1, wherein said forming apparatus comprises a rotatable turntable provided with lower mold parts of compression molding units in which said molding chamber is defined.

28. The device according to claim 1, wherein said forming apparatus comprises a conveyor belt on which closures advance, said molding chamber being defined in said closures.

29. A device for removing doses of plastic material from an extruder and delivering the doses to a forming apparatus in which the doses are compression-moulded, the device comprising at least one removal element which is movable with respect to said extruder for removing a dose and is provided with a receptacle for receiving the dose removed from an outflow orifice of said extruder, said removal element comprising a severing element that is adapted to cut into the plastic material dispensed by said extruder along a severing edge that advances through the material from one side of said orifice to the other, said removal element being provided with an inlet passageway which is partially bound by said severing edge and through which said dose is receivable into said receptacle, wherein said removal element is further provided with an outlet passageway transversely oriented with respect to said severing edge and through which said dose may be expelled from said receptacle, the receptacle retaining the dose while the at least one removing element moves from a first position, in which the at least one removing element interacts with the extruder, to a second position, in which the at least one removing element interacts with the forming apparatus, the receptacle depositing the dose into a recess associated to said forming apparatus and defining a molding chamber for the dose.

30. The device according to claim 29, wherein said forming apparatus comprises a rotatable turntable provided with lower mold parts of compression molding units in which said molding chamber is defined.

31. The device according to claim 29, wherein said forming apparatus comprises a conveyor belt on which closures advance, said molding chamber being defined in said closures.

* * * * *